(12) United States Patent
Hall et al.

(10) Patent No.: US 11,196,562 B2
(45) Date of Patent: Dec. 7, 2021

(54) MODULAR ELECTRONIC HARDWARE FOR DATA COMMUNICATION

(71) Applicant: Medic, Inc., Provo, UT (US)

(72) Inventors: David R. Hall, Provo, UT (US); Monte Johnson, Provo, UT (US); K. Jeffrey Campbell, Spanish Fork, UT (US); David Crismon, Herriman, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/904,046

(22) Filed: Jun. 17, 2020

(65) Prior Publication Data
US 2020/0396074 A1 Dec. 17, 2020

Related U.S. Application Data

(60) Provisional application No. 62/862,663, filed on Jun. 17, 2019, provisional application No. 62/888,780, filed on Aug. 19, 2019.

(51) Int. Cl.
*H04L 29/06* (2006.01)
*H04L 9/32* (2006.01)
(Continued)

(52) U.S. Cl.
CPC .......... *H04L 9/3213* (2013.01); *H04L 1/0023* (2013.01); *H04L 9/085* (2013.01); *H04W 12/037* (2021.01)

(58) Field of Classification Search
CPC ..... H04L 9/3213; H04L 1/0023; H04L 9/085; H04L 63/068; H04W 12/037; H04W 12/04; H04W 12/03; H04W 4/70
See application file for complete search history.

(56) References Cited

U.S. PATENT DOCUMENTS

2007/0019546 A1* 1/2007 Bauchot ................ H04W 40/00
370/230
2008/0144651 A1* 6/2008 Maldonado ............. H04L 69/22
370/465
(Continued)

OTHER PUBLICATIONS

Jan et al., "A Robust Authentication Scheme for Observing Resources in the Internet of Things Environment", 2014 IEEE 13th International Conference on Trust, Security and Privacy in Computing and Communications, Date of Conference: Sep. 24-26 (Year: 2020).*

*Primary Examiner* — Morshed Mehedi

(57) ABSTRACT

A node and methods for securely communicating information are described. The node includes a transducer that provides a first stream of data elements, a network interface, and a microcontroller. The microcontroller identifies a first data type associated with the first stream of data elements from the transducer, harvests each data element (e.g., measurement) from the first stream of data elements based on the first data type, aggregates a plurality of the measurements into an array of first measurements, generates a payload that includes a length identifier, a data type identifier that identifies the first data type, and the array of first measurements, identifies a destination for the payload, determines a token based on the identified destination, adds the identified token to the payload to form a datagram; and sends the datagram to the destination, via the network interface.

20 Claims, 6 Drawing Sheets

(51) Int. Cl.
*H04L 1/00* (2006.01)
*H04L 9/08* (2006.01)
*H04W 12/037* (2021.01)

(56) References Cited

U.S. PATENT DOCUMENTS

| | | | | |
|---|---|---|---|---|
| 2013/0094502 A1* | 4/2013 | Hwang | ................. | H04L 1/0083 370/389 |
| 2014/0019829 A1* | 1/2014 | Yang | .................... | H04L 1/0057 714/776 |
| 2018/0234471 A1* | 8/2018 | Qian | ................... | H04L 61/2514 |
| 2019/0386969 A1* | 12/2019 | Verzun | ................. | H04L 63/102 |

* cited by examiner

MODULAR ELECTRONIC HARDWARE FOR DATA COMMUNICATION

CROSS-REFERENCE TO RELATED APPLICATIONS

This application claims the benefit of U.S. Provisional Application No. 62/862,663, filed Jun. 17, 2019, and U.S. Provisional Application No. 62/888,780, filed Aug. 19, 2019, each of which is incorporated by reference herein in its entirety.

TECHNICAL FIELD

This application is related to securely communicating data from sensors.

BACKGROUND

With the growth of Internet of Things (IoT) devices, the amount of sensor data that is now accessible has grown exponentially. Some sensor data, such as sensor data related to medical/health information is sensitive and needs to be handled securely. Traditional IoT communication designs have insufficient security to properly protect sensitive information. Accordingly, a communication design is needed that enables sensitive data to be communicated reliably and securely is desired.

SUMMARY

In a first aspect, the disclosure describes a node. The node includes a transducer that provides a first stream of data elements, a network interface, and a microcontroller. The microcontroller includes memory and a processor in electronic communication with the memory that stores instructions that when executed by the processor cause the processor to identify a first data type associated with the first stream of data elements, harvest each data element from the first stream of data elements based on the first data type, wherein each data element in the first stream of data elements corresponds to a first measurement, aggregate a plurality of first measurements into an array of first measurements, generate a payload that includes a length identifier, a data type identifier that identifies the first data type, and the array of first measurements, identify a destination for the payload, determine a token based on the identified destination, add the identified token to the payload to form a datagram; and send the datagram to the destination, via the network interface.

In a second aspect, the disclosure provides that the token comprises a string of random characters.

In a third aspect, the disclosure provides that the string or random characters provide cryptographic security based on a secret state shared by the node and a second node.

In a fourth aspect the disclosure provides that the instructions are further executable by the processor to cryptographically secure the payload based on the identified token.

In a fifth aspect, the disclosure provides that instructions to cryptographically secure the payload based on the identified token comprise instructions executable by the processor to cryptographically secure the payload using at least a portion of the identified token.

In a sixth aspect, the disclosure provides that the payload further includes at least one of a transducer identifier, a timestamp, a data type version identifier, a sample period identifier, and a sample units identifier.

In a seventh aspect, the disclosure provides that the transducer provides a second stream of second data elements.

In an eighth aspect, the disclosure provides that the instructions are further executable by the processor to identify a second data type associated with the second stream of data elements, harvest each data element from the second stream of data elements based on the second data type, wherein each data element in the second stream of data elements corresponds to a second measurement, aggregate a plurality of second measurements into an array of second measurements, generate a second payload that includes a second length identifier, a second data type identifier that identifies the second data type, and the array of second measurements identify a second destination for the second payload, determine a second token based on the identified second destination, add the identified second token to the second payload to form a second datagram, and send the second datagram to the second destination, via the network interface.

In a ninth aspect, the disclosure provides that the instructions are further executable by the processor to process a plurality of data elements in the first stream of data elements via a processing application, wherein the processing application generates a third stream of third data elements.

In a tenth aspect, the disclosure provides that the instructions are further executable by the processor to identify a third data type associated with the third stream of data elements, harvest each data element from the third stream of data elements based on the third data type, wherein each data element in the third stream of data elements corresponds to a third measurement, aggregate a plurality of third measurements into an array of third measurements, generate a third payload that includes a third length identifier, a third data type identifier that identifies the Third data type, and the array of third measurements, identify a third destination for the third payload, determine a third token based on the identified third destination, add the identified third token to the third payload to form a third datagram, and send the third datagram to the third destination, via the network interface.

In an eleventh aspect, the disclosure describes a method for communication by a node. The method includes obtaining a first stream of data elements from a transducer, identifying a first data type associated with the first stream of data elements, harvesting each data element from the first stream of data elements based on the first data type, wherein each data element in the first stream of data elements corresponds to a first measurement, aggregating a plurality of first measurements into an array of first measurements, generating a payload that includes a length identifier, a data type identifier that identifies the first data type, and the array of first measurements, identifying a destination for the payload, determining a token based on the identified destination, adding the identified token to the payload to form a datagram, and sending the datagram to the destination.

In a twelfth aspect, the disclosure provides that the token comprises a string of random characters.

In a thirteenth aspect, the disclosure provides that the string or random characters provide cryptographic security based on a secret state shared by the node and a second node.

In a fourteenth aspect, the disclosure provides that the method further includes cryptographically securing the payload based on the identified token.

In a fifteenth aspect, the disclosure provides that cryptographically securing the payload based on the identified token comprises cryptographically securing the payload using at least a portion of the identified token.

In a sixteenth aspect, the disclosure provides that the payload further includes at least one of a transducer identifier, a timestamp, a data type version identifier, a sample period identifier, and a sample units identifier.

In a seventeenth aspect, the disclosure provides that the method further includes obtaining a second stream of data elements from the transducer.

In an eighteenth aspect, the disclosure provides that the method further includes identifying a second data type associated with the second stream of data elements, harvesting each data element from the second stream of data elements based on the second data type, wherein each data element in the second stream of data elements corresponds to a second measurement, aggregating a plurality of second measurements into an array of second measurements, generating a second payload that includes a second length identifier, a second data type identifier that identifies the second data type, and the array of second measurements, identifying a second destination for the second payload, determining a second token based on the identified second destination adding the identified second token to the second payload to form a second datagram, and sending the second datagram to the second destination.

In a nineteenth aspect, the disclosure provides that the method further includes processing a plurality of data elements in the first stream of data elements to obtain a third stream of data elements.

In a twentieth aspect, the disclosure provides that the method further includes identifying a third data type associated with the third stream of data elements, harvesting each data element from the third stream of data elements based on the third data type, wherein each data element in the third stream of data elements corresponds to a third measurement, aggregating a plurality of third measurements into an array of third measurements, generating a third payload that includes a third length identifier, a third data type identifier that identifies the third data type, and the array of third measurements, identifying a third destination for the third payload, determining a third token based on the identified third destination, adding the identified third token to the third payload to form a third datagram, and sending the third datagram to the third destination.

Further aspects and embodiments are provided in the foregoing drawings, detailed description, and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
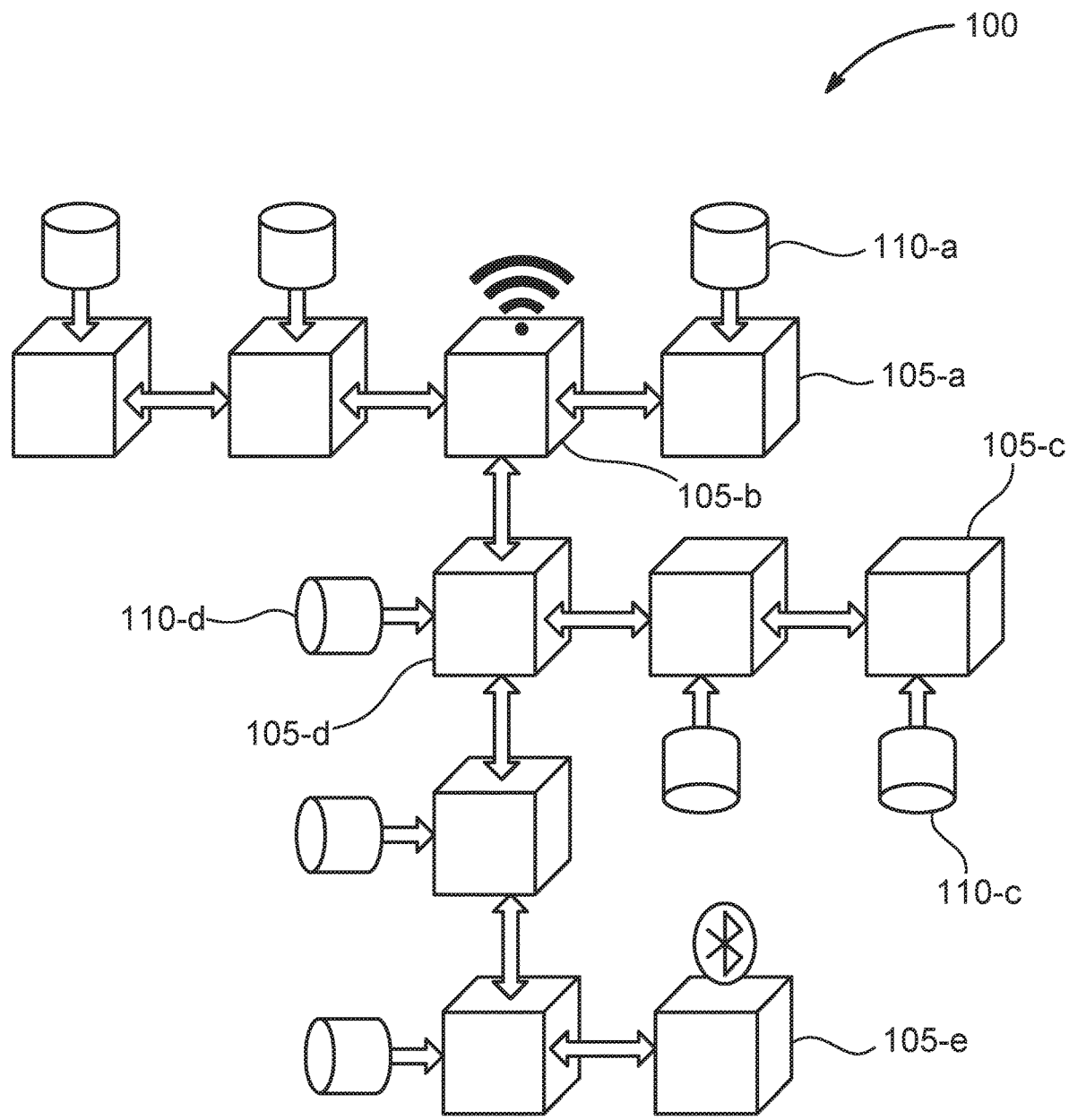
FIG. 1 is an exemplary environment of a network in which the described devices, systems, and methods may be implemented.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Modern smart systems often contain many (e.g., tens, hundreds, thousands, etc.) of sensors and actuators. Collecting high quality, reliable data from each of these sensors, and providing command and control functionality is a non-trivial process. These challenges are amplified when the data is sensitive (e.g., medical data), and strict adherence to privacy and data security requirements is necessary.

The described systems, devices, and methods provide a modular set of hardware and firmware to standardize the generation and delivery of data and commands across a local or distributed network of nodes while maintaining data quality, reliability, and security. Each data stream (corresponding to a particular type of measurement (e.g., weight, temperature, humidity, for example) is harvested, aggregated, and packaged together in a payload that is individually addressed by, and optionally secured (e.g., encrypted) with, a token that together with the payload form a datagram. This datagram forms a functional unit that can be transmitted securely across the network.

The datagram may be transmitted individually or may transmitted together with one or more other datagrams (of the same or different type). In some embodiments, the datagram may be further packaged (e.g., in a frame, such as in a Transport Control Protocol/Internet Protocol (TCP/IP) frame) alone or with one or more other datagrams (of the same or different type). Regardless of the number of intervening nodes, network hops, additional packaging/repackaging, each datagram is a fundamental unit, which when cryptographically secured using a token based on a shared secret known only by the originating node and the destination node, is also cryptographically secured between the originating node and the destination node.

As used herein, modular electronic hardware will be referred to as a node (e.g., a Medic Information Node Interface (MINI) node). A node includes a transducer interface, a microcontroller, and communication module. The microcontroller obtains a first stream of data elements from a transducer (e.g., sensor) via the transducer interface, identifies a first data type associated with the first stream of data elements, harvests each data element (e.g., measurement) from the first stream of data elements based on the first data type, aggregates a plurality measurement into an array of measurements, generates a payload that includes a length identifier, a data type identifier (e.g., the first data type, in this example), and the array of measurements, identifies a destination for the payload, determines a token based on the identified destination, adds the identified token to the payload to form a standardized datagram (e.g., Medic Information Transport Protocol (MITP) datagram), and sends the datagram to the communication module for transmission to the destination (e.g., a separate node, platform level service, web service, and the like).

Referring now to the Figures, FIG. 1 is an exemplary environment of a network 100 in which the described devices, systems, and methods may be implemented. The network 100 includes multiple nodes 105 that are connected via a combination of daisy chain and star topology. For example, node 105-*a* is connected to node 105-*b* in a daisy chain topology, while node 105-*b* is connected to node 105-*a* and node 105-*d* (and another node) in a star topology.

Nodes 105 may perform different functionality based on use case and/or design. For example, nodes 105-*a*, 105-*c*, and 105-*d* are each coupled to a respective transducer (e.g., transducer 110-*a*, 110-*c*, and 110-*d*, while node 105-*b* may be coupled to and/or provide a Wi-Fi bridge to Wi-Fi networks and node 105-*e* may be coupled to and/or provide a Bluetooth bridge to Bluetooth connections/networks.

In network 100, each node 105 is able to interact any of the other nodes 105 in the network 100 using various discovery/communication protocols. Because there is no defined structure to the network 100, data flow has no deterministic path (is not required to funnel to any one particular node 105).

Routing in network 100 is enabled using tokens. Often routing and security are handled separately (with security being an optional additional layer to the routing function, for example). In network 100, tokens can be static (which provides no security function, for example) or may by cryptographically secured (based on a shared secret between two nodes 105, for example)(which integrates routing and security together to secure both the routing information and the payload information, for example). This approach is described herein as "token secured routing."

Token secured routing is a protocol that integrates network routing and security into a unified paradigm. Token secured routing provides facilities for constructing and deconstructing network connections, facilities for identity verification, and facilities for information management. All of these facilities as well as other capabilities are created with security mechanisms integral to every step governing network traffic. Despite these capabilities, network 100 remains flexible and easy to use. For example, a node 105 with proper credentials will not notice any change in performance but will observe greater control over the node's own data and privacy. While a node without proper credentials will be unable to traverse the network 100.

In token secured routing, each point to point communication between two adjacent nodes 105 is governed by a token protocol that is specific to only those two adjacent nodes 105. As a result, a new token (e.g., a token specific to the next two nodes) must be generated at each node 105 for the next hop in the network 100 (with the exception of non-secured messages and/or static routes, for example). Because routing and security are both based on the token being used, both routing and security are enforced at each hop (e.g., step/node 105) in a communication route. This provides numerous features on both the routing side and the security side.

For example, on the routing side, these features include enabling flexible topologies, supporting multi-path, enabling a self-discoverable network, enabling an ad hoc network, enabling a self-healing network, enabling a supernet (built on top of the Internet, for example), providing a flexible implementation that can be adapted to run at the link layer, the transport layer, or the application layer, using multiple tokens to create layered routes and permission structures, providing traceability, providing auditable route tracing, and preventing circular routing without a time to live (TTL) field.

For example, on the security side, these features include providing routing transport control, providing identity of origin authentication, providing identity of destination authentication, facilitating reputation based trust augmentation, providing node-to-node guaranteed encryption, providing per-packet authorization, providing data connection owner identification, providing non-repudiation of delivery, providing non-repudiation of transmission, providing inherent blocking of unauthorized access, and providing per socket access control.

The creation of a token secured channel between two nodes 105 results in the addition of one or more entries in an inbound routing table and/or an outbound routing table of the originating node 105, the destination node 105, and any intervening nodes 105. In some embodiments, these inbound routing tables and/or outbound routing tables are managed by a packet router and firewall within the node 105.

In one example, transducer 110-*c* (e.g., a photoplethysmography (PPG) sensor) provides multiple different types (e.g., data types) of information (e.g., heart rate, blood pressure, blood oxygenation, etc.). Each of these different types of data (e.g., streams of data) may be obtained by the node 105-*c*. The node 105-*c* harvests each different stream of data elements separately resulting in separate datagrams for each different stream. The different datagrams may have different destinations (based on the token used, for example).

In this example, a datagram associated with a first stream of data elements (e.g., heart rate) may have a platform level service (e.g., a server or node 105 outside of network 100, for example) as the destination (which is accessed via node 105-*b*, for example). In this example, the originating node 105-*c* and the platform level service may have a token based on a shared secret between the node 105-*c* and the platform level service. Each datagram generated for the first stream of data elements includes and is routed based on this cryptographically secured token via a data path that includes node 105-*d* and node 105-*b*. Although each intervening node 105 (e.g., nodes 105-*d*, 105-*b*) may have inbound/outbound routing table entries that enable routing of each datagram to the platform level service, only node 105-*c* and the platform level service may decrypt the payload of the datagram (using the shared secret, for example) enabling secure communication between the originating node 105 and the destination for each individual stream of data elements.

Continuing with this example, a second stream of data elements (e.g., blood pressure) from node 105-c may have node 105-d (which may perform additional processing for example) as the destination. Similarly each datagram generated for the second stream of data elements includes a cryptographically secure token associated with node 105-d. Accordingly, each different type of data stream (e.g., stream of different type of data elements) is independently packaged, secured, and destined to provide reliable and secure communication.

Figure 2:
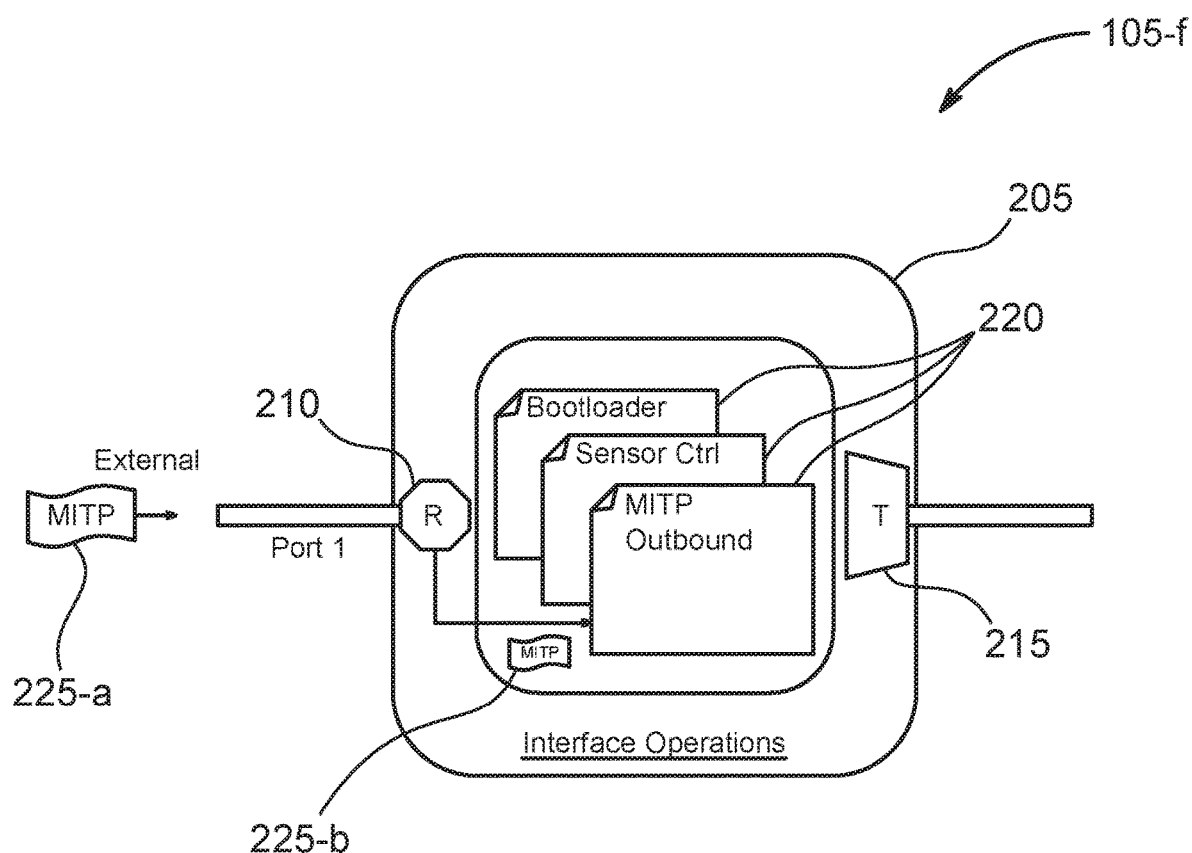
FIG. 2 is an exemplary embodiment of a node.

FIG. 2 is an exemplary embodiment of a node 105-f. The node 105-f is an example of any of the nodes 105 in network 100. Node 105-f includes a modular hardware/firmware package that provides an interface operations layer 205 that surrounds (providing a protective boundary, for example) to one or more applications 220.

Access to the interface operations 205 and to the one or more applications 220 is governed by a routing function 210. The routing function 210 includes an inbound routing table that maps inbound tokens to defined destinations (e.g., to one of the applications 220 or to a token in the outbound routing table) and an outbound routing tables that maps outbound tokens to defined destinations (e.g., a physical port with a particular port number). For example, the inbound routing table may have a unique destination address for each of the applications 220.

The routing function 210 may operate on and all communication within network 100 may utilize a special packet format referred herein as a Medic Information Transport Protocol (MITP) packet 225. The format of an MITP 225 packet is discussed more specifically with regard to FIG. 4.

An MITP packet 225-a that is external to the node 105-f may be received by the node 105-f via a physical port (e.g., Port 1). The MITP packet 225-a includes a token and a payload. The routing function 210 compares the token in the MITP packet with the tokens listed in the in inbound routing table. If the token in the MITP packet matches a token listed in the inbound routing table then the token is forwarded (e.g., MITP packet 225-b) to the destination corresponding to the matching token. It however, the token in the MITP packet does not match any of the tokens listed in the inbound routing table then the token is ignored or dropped. In this way, nodes 105-f are secured against unauthorized MITP packets (e.g., MITP packets having unrecognized tokens).

The one or applications 220 may perform specific functions. For example, there may be a bootloader application 220 that functionally enables the interface operations 205, a sensor controller 220 that harvests and generates sensor payloads, and an MITP outbound application that identifies tokens for outbound communications. As illustrated the inbound routing table in the routing function 210 may route the token in the incoming MITP packet 225-a with the MITP outbound application 220, such that the MITP packet 225-b is routed from the routing function 210 to the MITP outbound application 220.

In some embodiments, each application 220 implements this same node 105-f function, including the interface operations that includes a routing function, which provides the same security benefits. It is appreciated that the implementation of the node 105-f functions by an application 220 may be the smallest implementation of the node 105-f functions and those functions may be in their most simplified form (e.g., a single input (e.g., port) and a single output (e.g., port)).

The interface operations 205 may also include a transducer interface 215. The transducer interface 215 may receive the raw output of an internal or an external transducer (e.g., sensor). While much of the discussion herein relates to receiving data, such as the case when the transducer is a sensor (e.g., in input device), the transducer may alternatively be an actuator (e.g., an output device) and transducer interface sends commands to an internal or external transducer (e.g., actuator).

Figure 3:
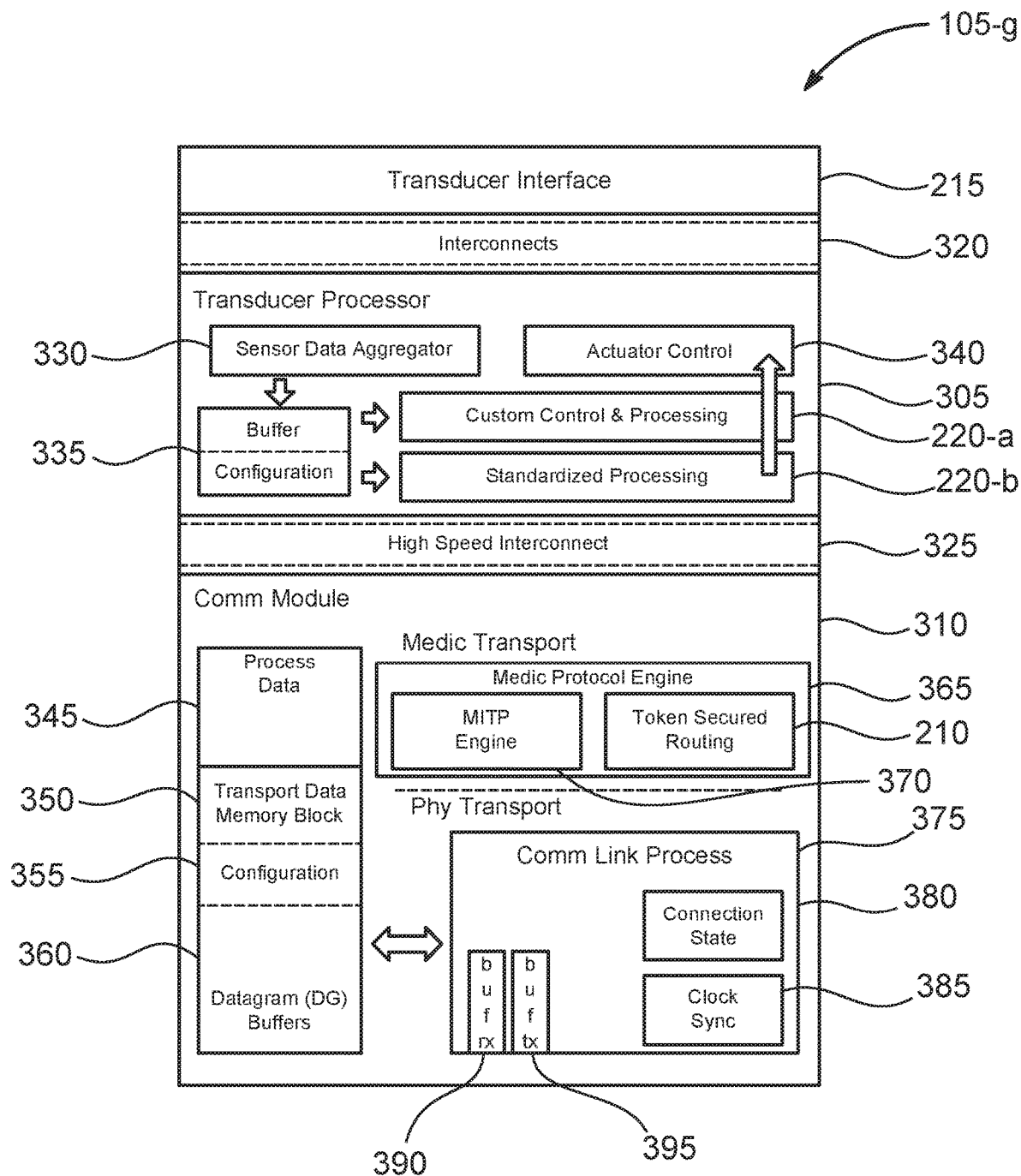
FIG. 3 is a block diagram illustrating one example of a node.

In some embodiments, a node 105-f may or may not be implemented in one single processor or package. In one example each component (transducer, processor, and communication module) is implemented in software on the same microprocessor or microcontroller. In another example, a node 105-f may be electronically interconnected (as illustrated in FIG. 3, for example) with some or all the transducers connected externally (having external transducer circuitry, for example). In yet another example, the transducers, internal or external to the processor, may be interconnected with a communication module that is implemented externally to the transducer processor. For instance, the communication module may be implemented on a second processor, on a FPGA, as an ASIC, or other computing technology.

In some embodiments, a device (e.g., a Medic Device) is a system comprised of at least one node 105 connected to a network (e.g., network 100). The network may be a peer-to-peer, ad-hoc network, in which nodes may be added or removed without any centralized network configuration as discussed with respect to FIG. 1.

FIG. 3 is a block diagram illustrating one example of a node 105-g. The node 105-g is an example of any of the nodes 105 discussed in the foregoing Figures. It is appreciated that the node 105-g implements the interface operations 205 discussed with respect to FIG. 2.

A node 105-g includes a transducer interface 215 (for interfacing with one or more (internal or externally connected) transducers, a transducer processor 305, and a communication module/network module 310. The one or more transducers may be a logical, minimal grouping of transducers (e.g., sensors and/or actuators). The transducer processor 305 may be a microcontroller (MCU) or microprocessing unit (MPU).

The transducer processor 305 may include a sensor data aggregator 330 that collects and aggregates the sensor data and feeds the data (e.g., configuration data (e.g., data type information) and sensor data (e.g., data payload)) into a set of buffers 335. The transducer processor 305 includes one or more applications (e.g., applications 220) for handling and/or processing the data. For example, a standardized processing application 220-b (e.g., standard processing unit (SPU)) may handle data flow and standard processing and/or control steps (based on data type (e.g., DeviceType.DataType 435), for example) within the transducer processor 305 (to/from different applications (e.g., applications 220) within the transducer processor 305, for example) and via the interfaces (e.g., transducer interface 215 with the transducers and/or the communication module 310). One or more additional applications 220-a may provide custom processing and/or custom control functionality (including actuator control via actuator control 340, for example).

In some embodiments, data is distinguished based on data type (e.g., DeviceType.DataType 435). In the case that a TransducerID (e.g., transducer identifier assigned to a transducer by the node **105-*g***) is assigned exactly to one Medic Data Type (MDT), then data may be distinguished based on TransducerID. It is appreciated that a single transducer (having a single TransducerID, for example) may provide/output multiple different types of data types, so that, as used herein, data is distinguished based on data type to ensure that each data stream (associated with a different data type, for example) is handled independently and properly.

Alternatively, each physical transducer in the node receives at least one TransducerID enumeration. TransducerIDs are static, immutable, and locally unique. In these cases, a physical sensor may be associated with multiple TransducerIDs if multiple data from the sensor is collected at different rates or is associated with different data types. Virtual transducers may also be defined if additional processing data is available, for example from the Custom Control & Processing application **220-*a*. However, even in these embodiments, each TransducerID in the node 105-*g*** is assigned exactly to one Medic Data Type (i.e., to ensure data distinction based on data type).

A memory buffer 335 in the Transducer Processor 305 is configured to store two copies of each output from each configured data type. The first buffer 335 is the read buffer and the second buffer 335 is the output buffer. Each buffer has associated full/empty flags to govern access. For each element stored in the buffers 335, the local clock at the sample time is recorded. The standardized processing application **220-*b* (e.g., Standardized Processing Unit (SPU)) is configured to receive standard MDT payloads for Actuator Control 340 interface. Standard MDT payloads are copied directly to the configured interface. Additional complexity may be implemented in the Custom Control & Processing application 220-*a***.

The standardized processing application **220-*b* is configured to accept values for each transducer datum from either the data buffer or the custom control & processing application 220-*a*. The standardized processing application 220-*b* informs the Medic Protocol Engine (MPE) 365 of each configured MDT payload it may send to the MPE 465. Although the MPE 365 is illustrated in being in the communication module 310, in other embodiments the MPE 365 is included in the transducer processor 305 (as part of the interface operations 205 and/or as an application 220 within the interface operations 205**, for example).

Figure 4:
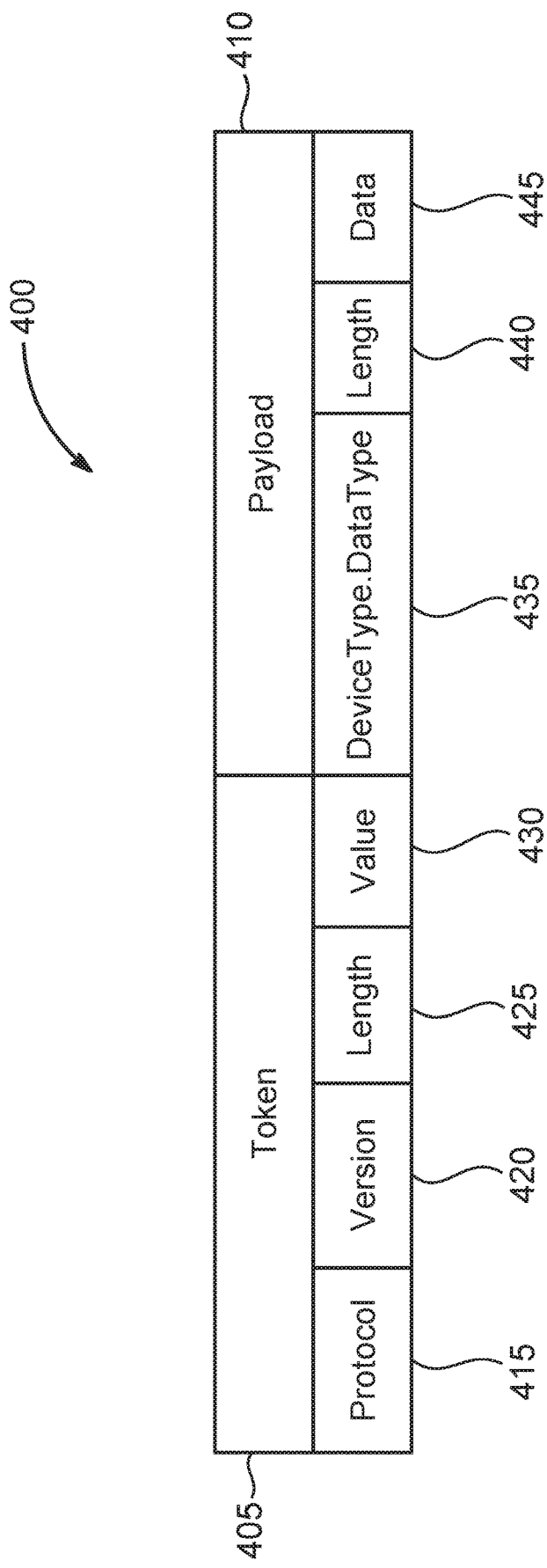
FIG. 4 is a block diagram illustrating one example of a packet.

As described more fully with respect to FIG. 4, each MDT payload may include the datatype, version, length, TransducerID, SamplePeriod, and/or SampleUnits. Depending on implementation, an MDT payload may be aggregated with other MDT payloads, which together form a single datagram, or may be transmitted individually, with a single MDT payload in each datagram. The token portion of the datagram, which identifies the intended destination network address for the datagram, is added to one or more MDT payloads to form the datagram (e.g., MIPT packet 225).

The transducer processor 305 (via a combination of the standardized processing application **220-*b*, the custom control processing application 220-*a*, and/or the Medic Protocol Engine (MPE) 365, for example) is configured to accumulate $M_t$ samples for each transducer, package those $M_t$ samples in an MDT payload, determine destination information (e.g., token information), and generate a datagram (e.g., MIPT packet 225) for sending via the communication module 310**.

The communication module 310 may be configured to support a particular version of the Medic Transfer Protocol. The communication module 310 is configured to support sending datagrams (e.g., MITP packets 225) of a particular frame size.

In one example, a unit data element is present on (i.e., provided to) the transducer interface 215. As the transducer processor 305 receives the data element, the transducer processor harvests the data element. In some embodiments, the data element may have a size of $N_t$ bits. The sensor data aggregator 330 copies the data element to its associated element (which aggregates the data elements into an array of $M_t$ elements, for example) in the input data buffer 335 and records the local clock time in the associated field (e.g., timestamp field).

For each data type in turn, governed by the data type sample rate, the standardized processing application **220-*b* gathers each datapoint (e.g., data element) in the associated MDT payload to the output buffer 335. For each MDT payload in the output buffer, if the "ready" flag is set, the standardized processing application 220-*b* transfers the MDT payload (e.g., data record (with local clock values)) to the MPE 365** using a predefined special purpose Medic Datagram.

The Medic protocol engine 365 receives the special purpose Medic Datagram. In some embodiments, the Medic protocol engine 365 (via the MITP engine 370, for example) analyzes the local clock values to ensure that sampling requirements have been met. The MITP engine 370 identifies a token (using the token secured routing function 210, for example) associated with the destination of the MDT payload. For instance, the MITP Engine 370 identifies the destination node and refers to the outbound routing table maintained by the token secured routing function to identify the token to use of that identified destination node. The MITP engine 370 packages the MDT payload with the identified token (and its associated header information, for example) to generate a datagram (e.g., MITP packet 225). This new datagram is stored in a frame buffer (not shown). At regular intervals, or when the frame buffer reaches a maximum frame size, the MITP engine 370 provides the datagram to the communication link process 375 in the communication module 310.

The Medic protocol engine 365 may utilize process data 345, transport data 350, configuration information 355, to generate a datagram (which is packaged together in the datagram buffers 360). Although each of these blocks is shown as being in the communication module 310, it is appreciated that in other embodiments, each of these blocks, including the Medic protocol engine 365 are in the transducer processor 305 (implemented via the interface operations 205 and/or in one or more applications 220, for example). The process data 345 may be the state machine associated with the token state of a connection between two nodes (as governed by the MITP engine 370, for example). The transport data memory block 350 may store parameters (e.g., token protocol, packet length, etc.) associated with properly formatting the frame associated with the datagram. The configuration 355 may store payload types and formats as well as data type configuration parameters so that datagrams (e.g., MITP packets) may be generated in a standardized form (according to the Medic Transport Protocol, for example).

The communication link process 375, which handles the link layer and physical layer transport of the datagram (e.g., MITP packet 225) transfers the frame (e.g., datagram) to an external node on/via the network (e.g., network 100). The external node may be the final destination of the datagram. The final destination may be a database, a platform level service, a web service, or another node (e.g., node 105, a MINI). In some embodiments, the external node may be a Medic Aggregator or Gateway, which packages many datagrams for transport downstream. The communication link process 375 includes a connection state 380 which establishes and maintains a connection state with a one or more nodes in the network (e.g., network 100). The clock sync 385 may ensure proper communication timing for communication on the network. Additionally, the communication link process 375 includes a transmit buffer 395 and a receive buffer 390 for enabling communication via the network.

In some embodiments, the medic protocol engine 365 provides the transport control layer of the communication stack. Accordingly, MITP packets (e.g., datagrams) may be transported over a wide variety of networks while maintaining the same end-to-end token-based security.

For example, when the communication link process 375 is connected to an Ethernet/TCP/IP network, the node 105-g will join the IP network using standard internet tools. In this example, data destination IP addresses and/or domains and credentials may be pre-programmed.

In another example, when the communication link process 375 is connected to a Medic LAN, the node 105-g is discovered by the rest of the network (e.g., network 100) when it sends a NodeHello Medic datagram. In this example, the Medic LAN may have at least one gateway device (e.g., a device that enables access to a platform level service). The gateway device may respond to a NodeHello by sending a GatewayHello Medic datagram addressed to the new node 105-g. In some embodiments, if the node 105-g does not receive a GatewayHello datagram, it concludes that it is not on a Medic LAN. In some embodiments, media addresses on the Medic LAN are derived from the first 48 bits of the globally unique identifier (GUID) of the node (e.g., node 105-g).

The NodeHello packet may contain the full GUID of the node, the maximum data frame size the node will send, and the node's associated data type. On collision (e.g., collision of media address) detection, the affected nodes may derive a new media address by performing a bit shift operation on the GUID. This operation may be repeated until the collision is eliminated.

In some embodiments, all datagrams (e.g., Medic datagrams) are encrypted prior to transport over a network (e.g., network 100). This encryption enables secure data communication regardless of the number of path between the originating node and the destination node.

In some embodiments, a node (e.g., node 105-g) may require input from a datagram (i.e., the MDT payload) generated by another node on the local area network (LAN). In these cases, a node with an external MDT payload dependency may send a NodeWho Medic datagram. This NodeWho Medic datagram may be broadcast to the network, may contain a list of MDT values that are requested, and may contain an authentication token that authorizes access of the list. A node that supports the requested MDT value may respond with a NodeConfig datagram (e.g., message) that lists support for the specified protocol(s). A NodeConfig datagram is addressed to the node that issued the corresponding NodeWho datagram.

In this, as in the case of all secure token generation (that is based on a shared secret between the two nodes, for example) the two nodes complete a handshake and token generation process. In this handshake and token generation process the two nodes confirm version compatibility, confirm datagram frequencies, confirm any timing requirements are met, registers the dependency (e.g., makes the appropriate inbound routing table and/or outbound routing table additions) at each node, verifies and establishes controls for data access restrictions, and establishes encryption and authentication protocols for transmitted data between the two nodes using the generated tokens.

FIG. 4 is a block diagram illustrating one example of a packet 400. The packet 400 (also referred to herein as datagram 400, MIPT packet 225, and transducer datagram) includes a token portion 405 and a payload portion 410. Each of the token portion 405 and the payload portion 410 may include a small header section (e.g., protocol 415, version 420, length 425 in the token portion 405 and DeviceType.DataType 435 and length 440 in the payload portion 410) for providing configuration information in addition to the token value 430 in the token portion 405 or the data 445 in the payload portion 410.

In some embodiments, the token portion 405 includes a token protocol 415, a token version 420, a length 425, and a value 430 (e.g., public token value). The token protocol 415 may specify a routing and security model for the data packet. The token protocol 415 may indicate a secure or insecure procedure, a specific routing destination, a generic nearest-neighbor destination, a network traversal search, or a broadcast mode. The token version 420 may provide compatibility information on the selected token protocol 415. The token length 425 may specify the number of bytes in the token value 430. The token value 430 (e.g., public token) provides routing and security information per the token protocol 415.

In some embodiments, the payload portion 410 includes a DeviceType.DataType 435, a data length 440, and data 445. The DeviceType.DataType 435 may specify the type, class, and/or formatting of the data 445. The data length 440 may specify the number bytes in the data 445. The data 445 may be the actual data payload.

As noted above, data (e.g., data from transducers) is standardized as a datagram 400 (e.g., MITP packets 225). In some embodiments, the minimum datagram structure of a datagram 400 consists of 128 bits. Each datagram 400 includes a header (e.g., token 405) and a value (e.g., payload 410).

The header includes a length description (e.g., length 425) and the payload includes a data type identifier (e.g., DeviceType.DataType 435, medic data type (MDT) identifier (ID) MDT ID). It is appreciated that different data types require different handling and/or processing. Accordingly, all data is classified as one of a defined set of data types (e.g., Medic Data Type (MDT, DeviceType.DataType 435). In some embodiments, an MDT is a statically defined data structure of N bytes. It is appreciated that all MDTs are enumerated (with an MDT identifier (ID), for example) and registered with the Medic network database (that defines the Medic network transport layer protocol, for example). MDT IDs may have an associated version number (see Table 1).

The data 445 of the datagram 400 is based on the DeviceType.DataType 435 (MDT ID) identified in the payload 410 (e.g., header information of the payload 410). While a variety of MDT IDs are possible, the following discussion focuses on MDT IDs associated with transducers. In particular, the following discussion focuses on MDT IDs associated with transducers that provide data (e.g., sensors). Such datagrams 400 may be referred to as transducer datagrams. However it is understood that datagram format may be uniform among all data types (e.g., MDT IDs) and that it is the identified data type (e.g., MDT ID) that distinguishes a transducer datagram from other datagrams (e.g., administrative datagram, control datagram, etc.).

The data 445 (e.g., value) of a transducer datagram 400 is an array of $M_t$ elements (e.g., data structures of size $N_t$), where $N_t$ is the number of bytes in the data structure (e.g., $M_t$ element) for a particular data type (e.g., DeviceType.DataType 435=t, and where each $M_t$ element represents a sensor reading/measurement at a particular time and/or location (as identified by a timestamp and/or geolocation pin, for example) for a particular data type (e.g., DeviceType.DataType 435). It is appreciated that in some embodiments, a data type may correspond with a particular transducer (having a TransducerID). However, in other embodiments a particular transducer may provide multiple different data types of information.

In some embodiments, an datagram 400 is structured as set forth in Table 1, below, with the header portion of the payload 410 being expanded (beyond just the DeviceType.DataType 435 and length 440 as illustrated in datagram 400, for example) to include any or all of the fields identified in Table 1.

As illustrated in Table 1, the datagram includes payload header information including length (e.g., length 440), datatype (e.g., DeviceType.DataType 435, MDT ID), version (e.g., MDT ID version), TransducerID (e.g., the ID associated with the transducer that is supplying the data stream), sample period (e.g., the time interval separating each sample value (e.g., $M_t$ element), sample units (e.g., encoding for sample period units), sample error (e.g., sample rate error detected), and timestamp (e.g., Unix timestamp for the datagram 400, and a data payload or value field (e.g., data 445) that includes the array of $M_t$ elements that are each $N_t$ bytes.

TABLE 1

| Field | Size (bits) | Description |
| --- | --- | --- |
| Length | 16 | Number subsequent bytes in datagram |
| Datatype | 16 | Medic Data Type ID |
| Version | 8 | Datatype version number |
| TransducerID | 8 | 256 possible transducer elements |
| SamplePeriod | 13 | Time interval separating each value |
| SampleUnits | 2 | Encoding for sample period units |
| SampleError | 1 | Sample rate error detected |
| Timestamp | 64 | Unix timestamp |
| Value | $M_t \times N_t$ | Data payload; array; $M_t$ entries of $N_t$ bytes |

Figure 5:
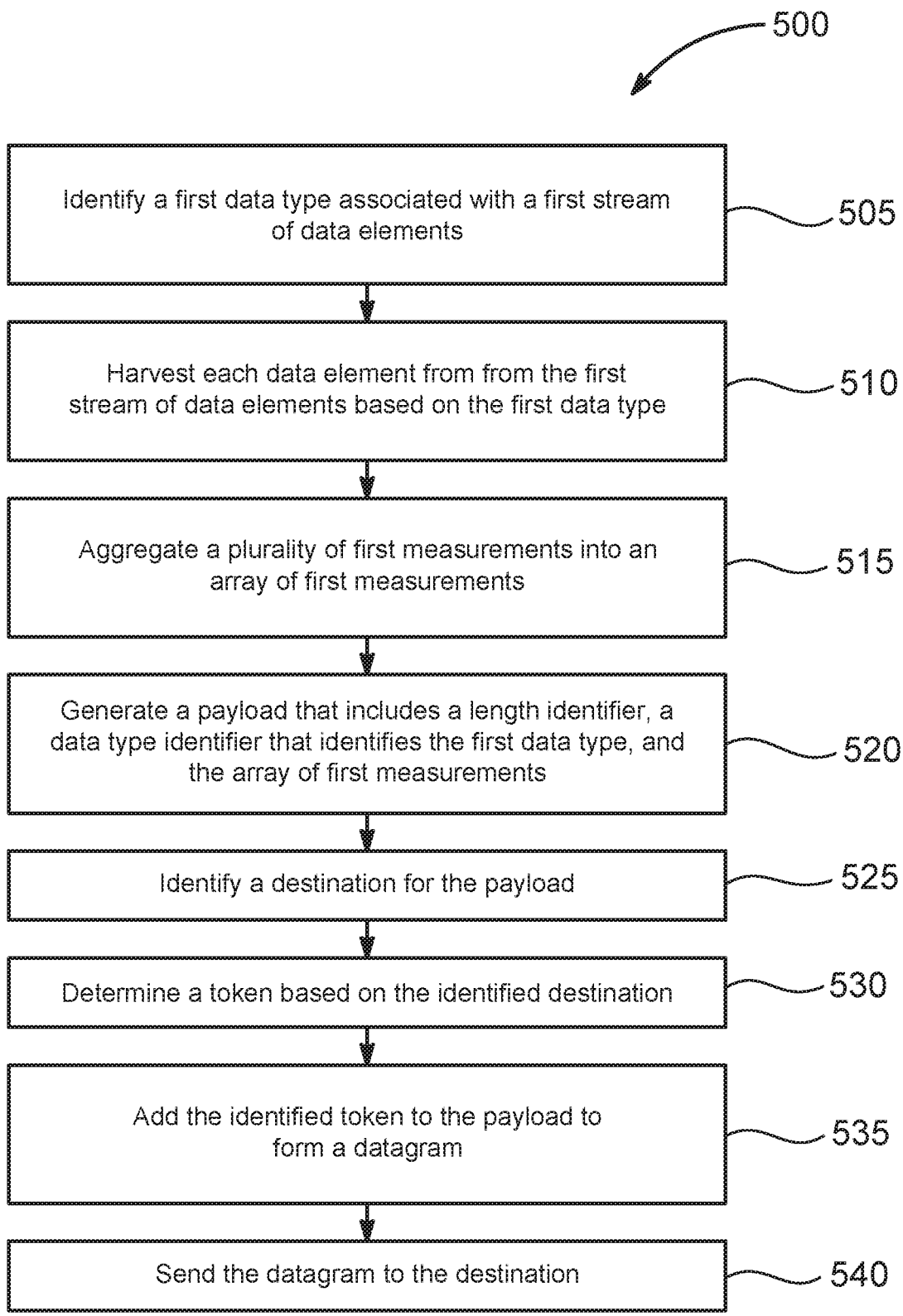
FIG. 5 is a flow diagram illustrating one example of a method for communicating data.

FIG. 5 is a flow diagram illustrating one example of a method 500 for communicating data. The method 500 may be implemented by a node 105 and more specifically by the transducer processor 305 or an application specific processor (e.g., processor and memory) included within the node 105.

At 505, a first data type associated with a first stream of data elements is identified. At 510, each data element from the first stream of data elements is harvested based on the first data type. At 515, a plurality of first measurements are aggregated into an array of first measurements. At 520, a payload that includes a length identifier, a data type identifier, and the array of first measurements is generated. The data type identifier identifies the first data type. At 525, a destination for the payload is identified. At 530 a token is determined based on the identified destination. At 535, the identified token is added to the payload to form a datagram. At 540, the datagram is sent to the destination.

Figure 6:
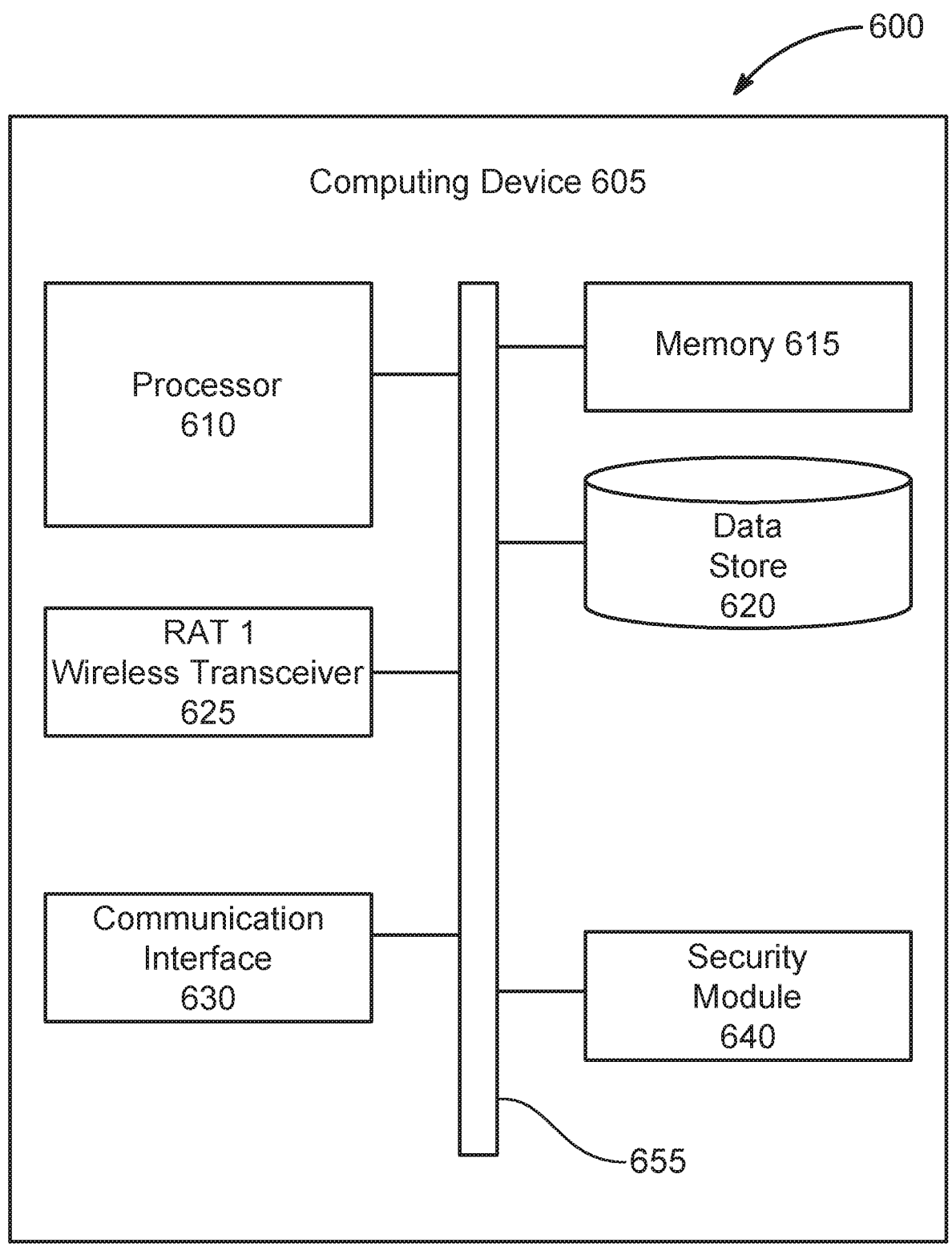
FIG. 6 is a block diagram of a computing device for implementing the described systems, methods, and devices.

FIG. 6 is a block diagram 600 of a computing device 605 for implementing the described systems, methods, and devices. In some embodiments, the node 105 may be an example of the computing device 605.

The computing device 605 includes a processor 610 (including a general-purpose processor and one or more application specific processors, for example), an optional wireless transceiver 625 for communicating via a first radio access technology (RAT) (e.g., 3G, 4G, LTE, 5G-NR, and/or LoRaWAN), an optional communication interface 630 for communicating via a network (e.g., wired (e.g., Medic LAN, Ethernet), wireless (e.g., Bluetooth, Wi-Fi)), a memory 615 (e.g., random access memory (RAM), non-volatile RAM (NVRAM)), data store 620 (e.g., hard disk drive, solid state disk), a security module 640 that implements the token secured routing functions, and an interconnect or bus 655 for interconnecting each of the components 610-640.

In some embodiments, the memory 615 and/or the data store 620 (each being a non-transitory storage medium, for example) may store instructions that are executable by the processor 610 (e.g., processor and memory 615) to implement the systems, methods, and devices described herein. For example, the instructions may be executable by the processor 610 to implement any of the methods (e.g., method 500).

The invention has been described with reference to various specific and preferred embodiments and techniques. Nevertheless, it is understood that many variations and modifications may be made while remaining within the spirit and scope of the invention.

What is claimed is:

1. A node, comprising:
a transducer that provides a first stream of data elements;
a network interface;
a microcontroller, the microcontroller comprising;
   a memory; and
   a processor in electronic communication with the memory stores instructions that when executed by the processor cause the processor to:
      identify a first data type associated with the first stream of data elements;
      harvest each data element from the first stream of data elements based on the first data type, wherein each data element in the first stream of data elements corresponds to a first measurement;
      aggregate a plurality of first measurements into an array of first measurements;
      generate a payload that includes a length identifier, a data type identifier that identifies the first data type, and the array of first measurements;
      identify a destination for the payload;
      determine a token based on the identified destination;
      add the identified token to the payload to form a datagram; and
      send the datagram to the destination, via the network interface.

2. The node of claim 1, wherein the token comprises a string of random characters.

3. The node of claim 2, wherein the string or random characters provide cryptographic security based on a secret state shared by the node and a second node.

4. The node of claim 3, wherein the instructions are further executable by the processor to cryptographically secure the payload based on the identified token.

5. The node of claim 4, wherein the instructions to cryptographically secure the payload based on the identified token comprise instructions executable by the processor to cryptographically secure the payload using at least a portion of the identified token.

6. The node of claim 1, wherein the payload further includes at least one of a transducer identifier, a timestamp, a data type version identifier, a sample period identifier, and a sample units identifier.

7. The node of claim 1, wherein the transducer provides a second stream of second data elements.

8. The node of claim 7, wherein the instructions are further executable by the processor to:
  identify a second data type associated with the second stream of data elements;
  harvest each data element from the second stream of data elements based on the second data type, wherein each data element in the second stream of data elements corresponds to a second measurement;
  aggregate a plurality of second measurements into an array of second measurements;
  generate a second payload that includes a second length identifier, a second data type identifier that identifies the second data type, and the array of second measurements;
  identify a second destination for the second payload;
  determine a second token based on the identified second destination;
  add the identified second token to the second payload to form a second datagram; and
  send the second datagram to the second destination, via the network interface.

9. The node of claim 1, wherein the instructions are further executable by the processor to:
  process a plurality of data elements in the first stream of data elements via a processing application, wherein the processing application generates a third stream of third data elements.

10. The node of claim 9, wherein the instructions are further executable by the processor to:
  identify a third data type associated with the third stream of data elements;
  harvest each data element from the third stream of data elements based on the third data type, wherein each data element in the third stream of data elements corresponds to a third measurement;
  aggregate a plurality of third measurements into an array of third measurements;
  generate a third payload that includes a third length identifier, a third data type identifier that identifies the Third data type, and the array of third measurements;
  identify a third destination for the third payload;
  determine a third token based on the identified third destination;
  add the identified third token to the third payload to form a third datagram; and
  send the third datagram to the third destination, via the network interface.

11. A method for communication by a node, comprising:
  obtaining a first stream of data elements from a transducer;
  identifying a first data type associated with the first stream of data elements;
  harvesting each data element from the first stream of data elements based on the first data type, wherein each data element in the first stream of data elements corresponds to a first measurement;
  aggregating a plurality of first measurements into an array of first measurements;
  generating a payload that includes a length identifier, a data type identifier that identifies the first data type, and the array of first measurements;
  identifying a destination for the payload;
  determining a token based on the identified destination;
  adding the identified token to the payload to form a datagram; and
  sending the datagram to the destination.

12. The method of claim 11, wherein the token comprises a string of random characters.

13. The method of claim 12, wherein the string or random characters provide cryptographic security based on a secret state shared by the node and a second node.

14. The method of claim 13, further comprising cryptographically securing the payload based on the identified token.

15. The method of claim 14, wherein cryptographically securing the payload based on the identified token comprises cryptographically securing the payload using at least a portion of the identified token.

16. The method of claim 11, wherein the payload further includes at least one of a transducer identifier, a timestamp, a data type version identifier, a sample period identifier, and a sample units identifier.

17. The method of claim 11, further comprising obtaining a second stream of data elements from the transducer.

18. The method of claim 17, further comprising:
  identifying a second data type associated with the second stream of data elements;
  harvesting each data element from the second stream of data elements based on the second data type, wherein each data element in the second stream of data elements corresponds to a second measurement;
  aggregating a plurality of second measurements into an array of second measurements;
  generating a second payload that includes a second length identifier, a second data type identifier that identifies the second data type, and the array of second measurements;
  identifying a second destination for the second payload;
  determining a second token based on the identified second destination;
  adding the identified second token to the second payload to form a second datagram; and
  sending the second datagram to the second destination.

19. The method of claim 11, further comprising:
  processing a plurality of data elements in the first stream of data elements to obtain a third stream of data elements.

20. The method of claim 19, further comprising:
  identifying a third data type associated with the third stream of data elements;
  harvesting each data element from the third stream of data elements based on the third data type, wherein each data element in the third stream of data elements corresponds to a third measurement;
  aggregating a plurality of third measurements into an array of third measurements;
  generating a third payload that includes a third length identifier, a third data type identifier that identifies the third data type, and the array of third measurements;
  identifying a third destination for the third payload;
  determining a third token based on the identified third destination;
  adding the identified third token to the third payload to form a third datagram; and
  sending the third datagram to the third destination.

* * * * *